United States Patent [19]

Karp, Jr. et al.

[11] 3,708,916
[45] Jan. 9, 1973

[54] MOVABLE WALL PANEL SYSTEMS

[75] Inventors: Joseph G. Karp, Jr.; Robert F. McCurdy, both of New Castle, Ind.

[73] Assignee: American Standard Inc., New York, N.Y.

[22] Filed: April 23, 1971

[21] Appl. No.: 136,811

[52] U.S. Cl. ..........................49/409, 16/97, 104/105
[51] Int. Cl. .............................................E05d 13/02
[58] Field of Search............................49/409–411; 104/96, 105, 130; 16/95–97, 103

[56] References Cited

UNITED STATES PATENTS

| | | | |
|---|---|---|---|
| 3,181,274 | 5/1965 | Izenour | 16/96 R X |
| 1,889,112 | 11/1932 | Shoemaker | 49/409 X |

*Primary Examiner*—Kenneth Downey
*Attorney*—Marechal, Biebel, French & Bugg

[57] ABSTRACT

Trolleys for movable wall panels are particularly adapted to negotiate track intersections, turns, and parallel track stacking intersections. The trolley body is formed with a support surface positioned slightly above the rolling contact surface of the trolley wheels. The support surface permits sliding movement of the trolley through the intersection gap while preventing the trolley wheels from falling into the track slot. In one embodiment, four trolley wheels are positioned mutually at right angles with the support surface in the arcuate spaces between the wheels. In another embodiment, two trolley wheels in combination with centering and guide rollers are combined with a support plate, which plate carries a layer of low-friction material.

4 Claims, 14 Drawing Figures

PATENTED JAN 9 1973 3,708,916
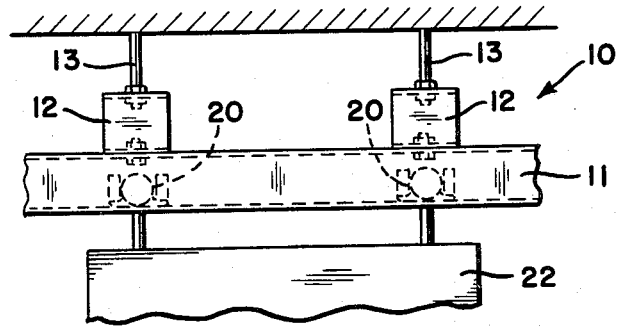
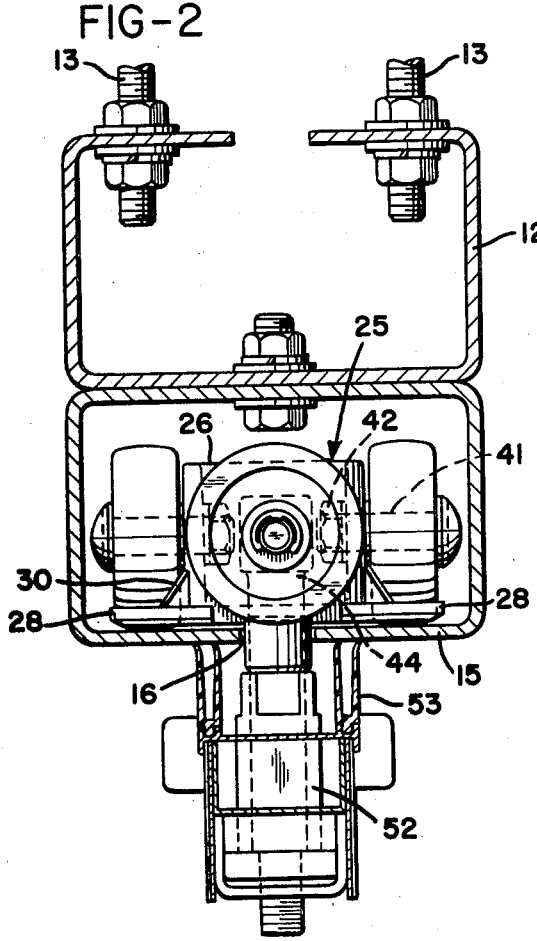
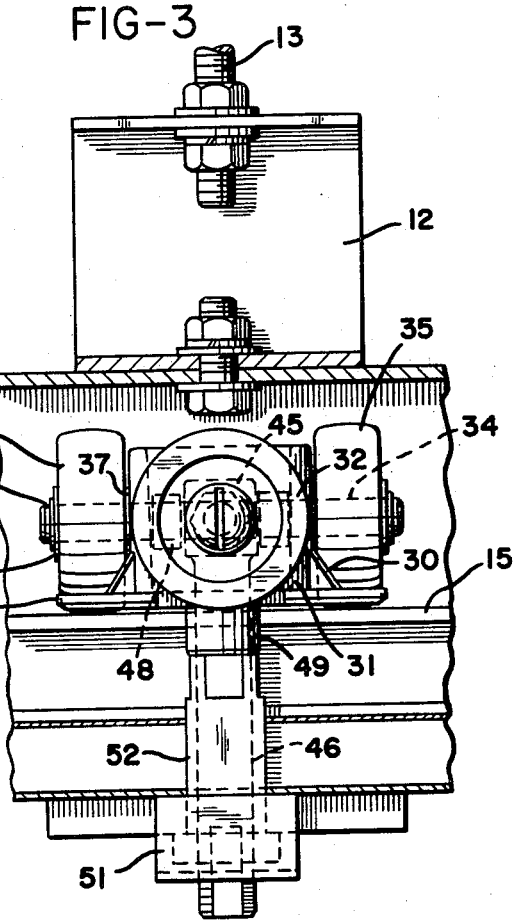
INVENTORS
JOSEPH G. KARP, JR. &
ROBERT F. McCURDY
BY *Marechal Biebel, French & Bugg*
ATTORNEYS

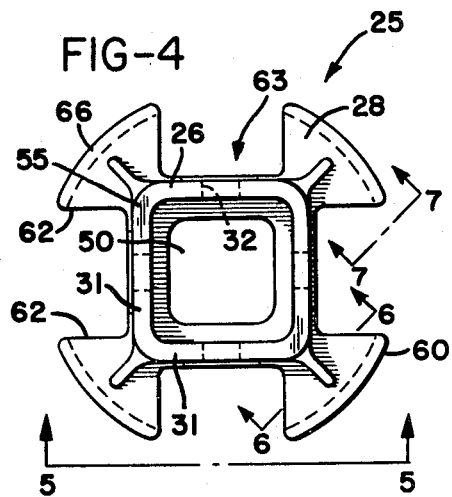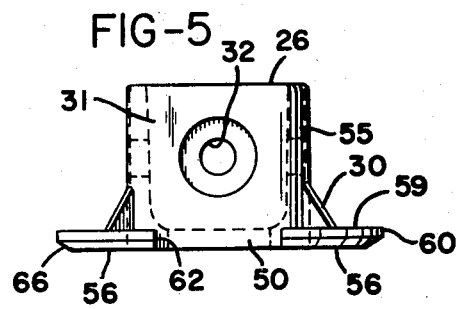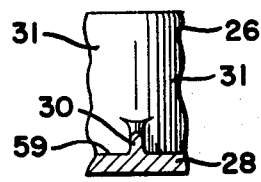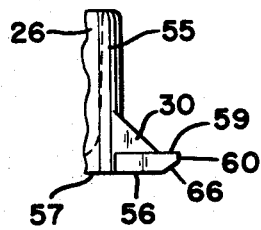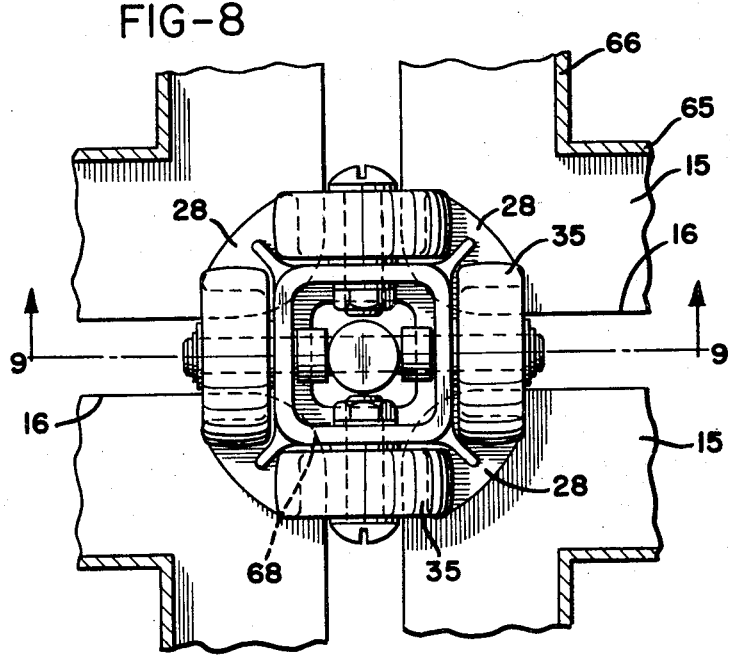

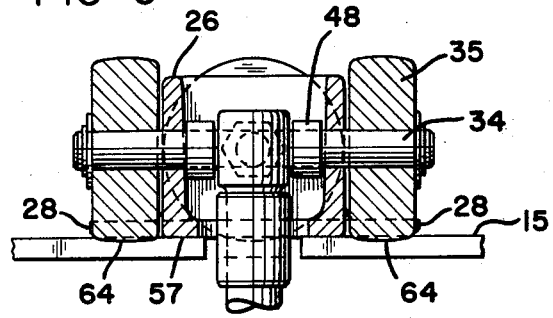
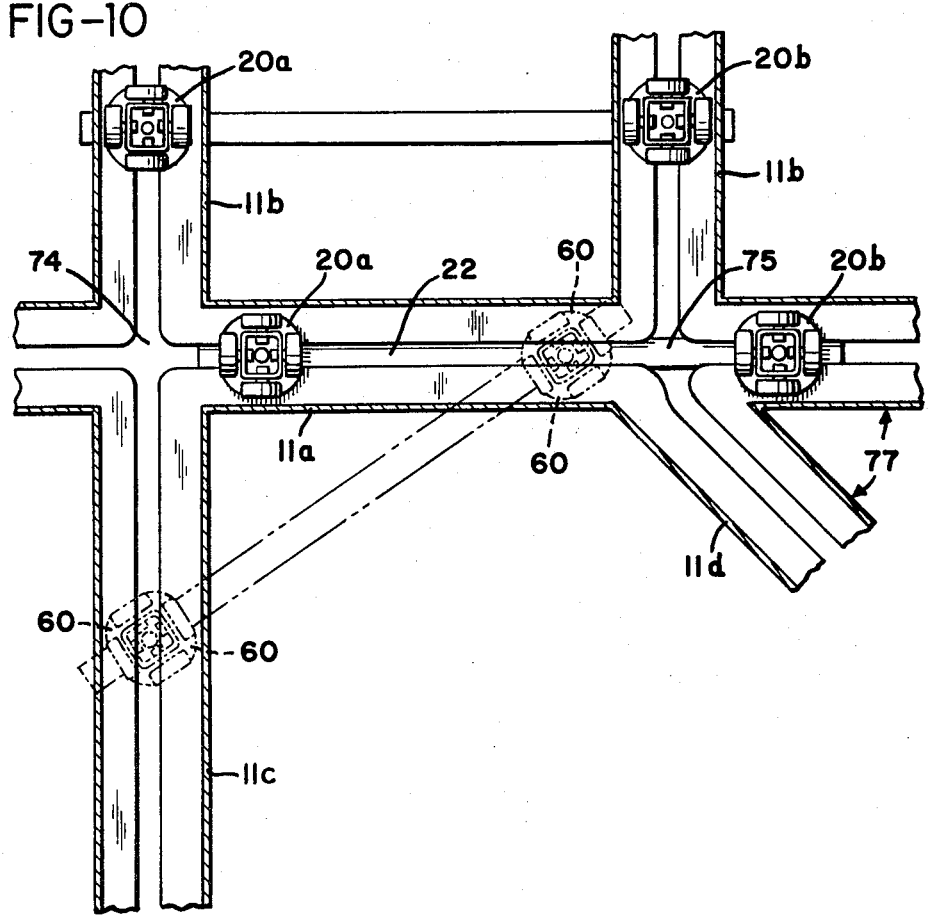

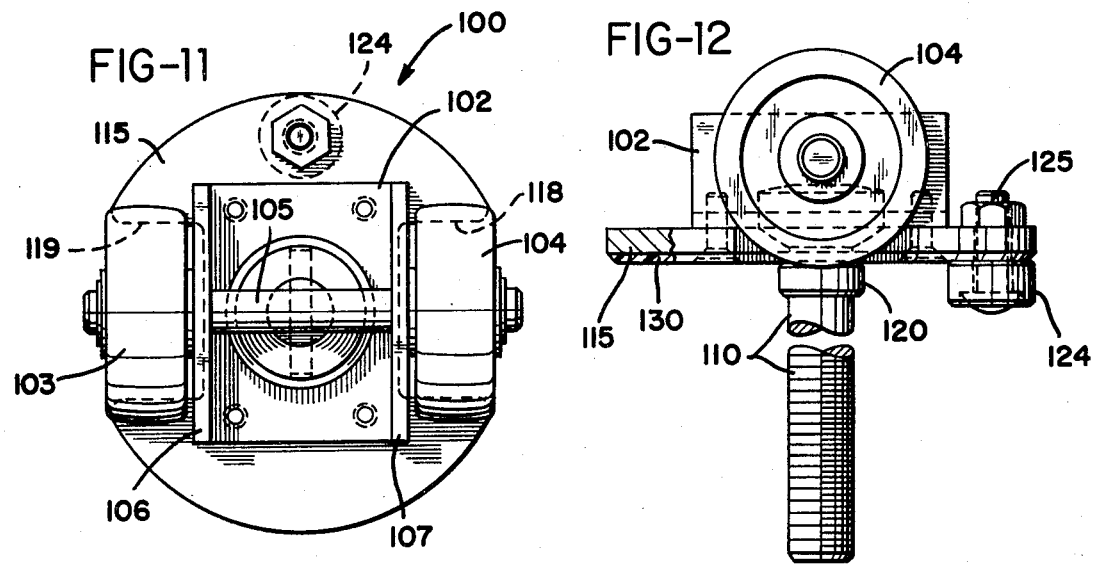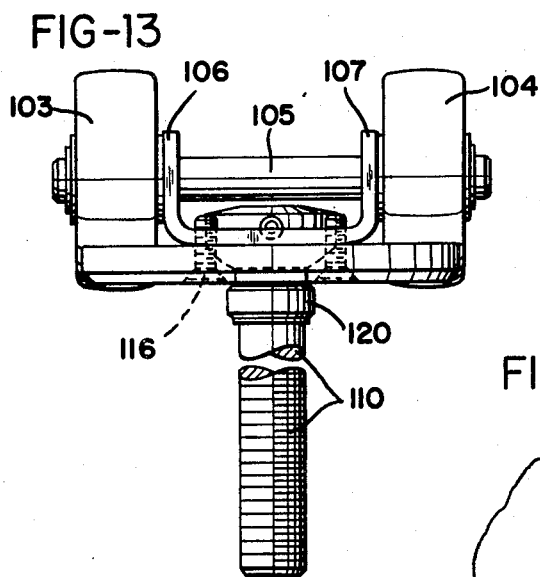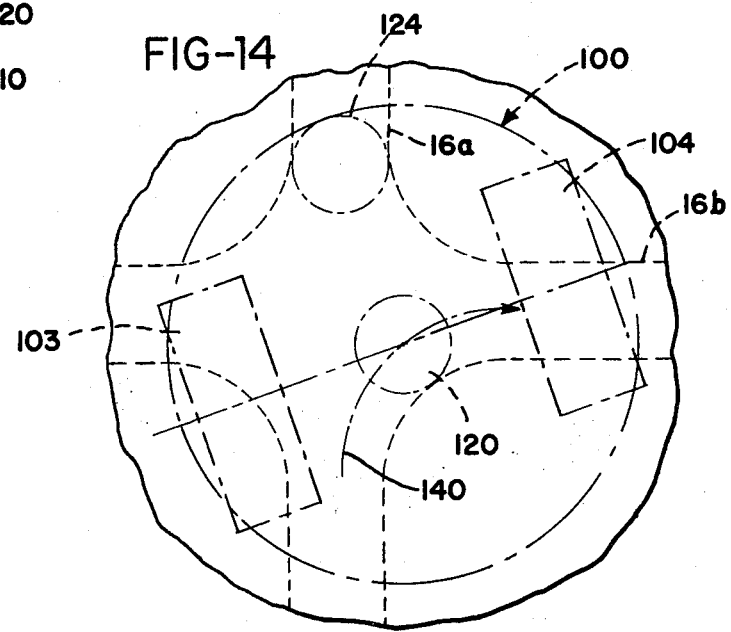

MOVABLE WALL PANEL SYSTEMS

BACKGROUND OF THE INVENTION

In movable panel systems of the type adapted for use in the hotels, clubs, convention halls, and the like, for temporary division of large rooms into small rooms or the like, the overhead tracks on which trolleys ride commonly include corners and intersections so that the panels may either be stored or moved to a different location. In many instances, the panels are quite heavy and may extend from the floor to a ceiling as high as 20 feet or more. It is therefore quite important that the trolleys be able to negotiate intersections with a minimum of effort, since they are usually manipulated from the floor by hand.

A number of trolley structures have been developed for negotiating right-hand turns and/or intersections and the like. For example, the trolley disclosed in U.S. pat. No. 1,889,112 of 1932 includes two pairs of wheels at right angles to each other, with a guide means for keeping the wheels aligned with the truck. When reaching an intersection, however, the wheels drop into and rest in the track slots between the tracks. As a result, considerable force is required to move the trolley horizontally onto the next track. The force required includes a vertical lifting force and a concurrent horizontal force, and consequently it would be difficult and awkward to properly negotiate heavy wall panels around a right-angle turn with this type of trolley.

Other types of trolley arrangements are disclosed in U.S. Pat. Nos. 3,253,552 of 1966 and 3,462,792 of 1969. These structures utilize a plurality of spaced spherical bearing members attached to a bearing plate about a circular path, and a sufficient number of bearing members must be used so that, while negotiating an intersection, there are more bearing members engaging the track than bearing members disposed above the track slots, to prevent the bearing members from dropping into the slots.

SUMMARY OF THE INVENTION

The present invention is directed to an improved movable wall system and trolley construction. In one embodiment, the trolleys utilize two pairs of wheels at right angles to each other, in which the trolleys provide a support structure for enabling the wheels to negotiate a sharp turn or an intersection with a smooth, relatively effortless movement. In general, the invention has support structure which prevents the wheels from falling into the track slots so that heavy wall panels may be manipulated from a floor through or around intersections with a minimum of effort.

One or more support platforms are formed in the trolley body in the spaces between adjacent wheels and define an essentially flat lower support and sliding surface in a horizontal plane spaced above the plane of the wheels.

The support platform is adapted to engage the track when a trolley negotiates an intersection, and allows the wheels to fall into the slots only a few thousandths of an inch, and prevents the wheels from dropping deep into the slots where they would be difficult to lift to start rolling again. The lowermost surface of the platform is essentially flat and smooth, and provides a smooth and relatively effortless transition of movement of the trolleys over an intersection. When tranversing a right angle corner for example, the wheels not in alignment with the track go through a transition of movement from rolling to sliding and back to rolling.

In another embodiment of the invention, a trolley is shown employing conventionally two main wheels in combination with a centering roller and a guide roller, and further including a low-friction support plate by means of which the trolley is supported when traversing an intersection or turning a corner.

Accordingly, one of the objects of the present invention is to provide a movable wall system which includes means for facilitating the negotiating of turns and intersections.

Another important object of the invention is to provide a movable wall system having a trolley for supporting wall panels and which includes means for facilitating the negotiating of intersections with a minimum of effort.

A further object is the provision of a trolley of the type having two pairs of rollers at right angles to each other which will negotiate a right-angle turn intersection and which will prevent the rollers from falling deep into the track slot when such intersections are encountered.

These and other objects and advantages of the invention will be apparent from drawings, the accompanying description, and the appended claims.

DESCRIPTION OF THE DRAWINGS

FIG. 1 is a fragmentary side view of a wall panel suspended from a pair of trolleys supported by an overhead track system according to the present invention;

FIG. 2 is an enlarged transverse sectional view across the overhead track and wall panel shown in FIG. 1; with the trolley shown in full lines;

FIG. 3 is a longitudinal sectional view through the overhead track and wall panel shown in FIG. 1, with the trolley shown in full lines;

FIG. 4 is a top plan view of the yoke portion of the trolley of the present invention;

FIG. 5 is an end elevation view of the yoke portion looking along line 5—5 in FIG. 4;

FIG. 6 is a fragmentary section taken generally along line 6—6 in FIG. 4;

FIG. 7 is a partially cut away view looking along line 7—7 in FIG. 4;

FIG. 8 is a top view of a trolley disposed at a right-angle turn intersection;

FIG. 9 is a transverse sectional view taken generally along line 9—9 in FIG. 8;

FIG. 10 is a schematic top view of a track arrangement showing how a wall panel may be moved through turns of 90° or more and how such panels may be stacked in a pair of tracks perpendicular to a main track;

FIG. 11 is a plan view of a modified trolley of this invention;

FIG. 12 is a side elevation thereof;

FIG. 13 is an end elevation thereof; and

FIG. 14 is a diagram showing one manner in which the trolley of FIGS. 11–13 negotiates right-angle intersections.

DESCRIPTION OF THE PREFERRED EMBODIMENTS

Referring to FIG. 1, a movable wall system 10 of the present invention includes a longitudinal track 11 suspended from or attached to the ceiling or roof of a room, gymnasium auditorium, convention hall or the like. The track 11 is conveniently comprised of a metal sheet formed with a C-shaped cross-section, and is shown as being bolted to a series of inverted track segments 12 of the same cross-section and connected to the ceiling by pairs of support rods 13. The track 11 includes a pair of inwardly facing track sections or flanges 15 (FIG. 2) which define a slot 16 therebetween, and may include turns and intersections, such as shown in FIGS. 8 and 10.

The upper surfaces of the track flanges 15 are adapted to support trolleys 20 which, in turn support one or more wall panels 22 or the like. Referring to FIGS. 2-3, each trolley 20 includes a yoke 25 having a cup-like body 26. The body defines trolley support means in the form of a series of integral, radially extending web-like platforms 28 cantilevered from the body 26 supported by inclined integral struts 30. The body 26 is preferably generally rectangular in cross section (FIG. 4), and the sides 31 thereof are provided with radially extending openings 32. The openings 32 in the opposite sides are aligned on axes at right angles to each other.

A transverse axle member 34 is supported across one pair of opposing sides 31 in the openings 32 therein, and rotatably supports one pair of wheels or rollers 35 (FIG. 3) outboard of the sides 31 of the body 26. A spacing washer 37 is disposed on each side of each wheel 35, and wire clips 38 retain the wheels on the axle member 34. A pair of bolts 41 rotatably support a second pair of trolley wheels 35 at right angles to the wheels 35 (FIG. 2) on the other side openings 32 therein, and are retained by nuts 42.

A pendant bolt 44 is suspended from the axle member 34 and has an upper body portion 45 and a lower shank portion 46. The axle member 34 supports the body portion 45 through a transverse bore 47 (FIG. 9), and a spacing member 48 is disposed between the body portion 45 and each side wall 31 of the body 26 to maintain the body 45 centrally within trolley 20.

The shank portion 46 of the bolt 44 carries a centering roller 49 and extends downwardly through a central opening 50 (FIG. 5) in the yoke, and is rigidly connected to the wall panel 22. The centering roller 49 is positioned within the slot 16 by any suitable means. In the structure shown in FIGS. 2-3, the shank portion 46 is threaded into a receiving member 51 attached to the top of the panel 22, and a vertically extending spacer 52 extending between flexible upper strips 53 locates the centering roller 49 in the slots 16.

The yoke 25 is shown in detail in FIGS. 4-7. The web-like platforms 28 are preferably integrally formed as part of the yoke 25, although they may as well be welded or otherwise attached. In this embodiment, the trolley support surface means consist of a series of four platforms 28 extend radially outwardly from the base of the four corners 55 of the body 26, and their lowermost surfaces 56 (FIG. 5) define a common horizontal plane with the lowermost surfaces 57 of the body. Each platform 28 is essentially a thin triangular disc (FIG. 4) disposed in an arcuate space between neighboring or adjacent wheels, and is cantileveredly reinforced by one of the inclined struts 30, preferably integral with and extending between the upper surface 59 (FIG. 6) of the platform 28 and the corner 55 defined by the adjacent side walls 31 (FIGS. 6-7).

The triangular configuration is defined by an arcuate outer surface 60 (FIG. 4) which extends between a pair of inner inwardly extending and converging side surfaces 62. The side surfaces 62 of peripherally adjacent platforms 28 define generally rectangular spaces or openings 63 through which extend the bottom peripheral portions of the wheels 35. The outer surfaces 60 are preferably arcuate and the lowermost surfaces 56 are preferably smooth, and both surfaces facilitate negotiation of turns and intersections. The surfaces 56 preferably have chamfered edges 66 at the arcuate surfaces 60 which also facilitate movement of the trolley member around turns.

The wheels 35 are connected to the yoke 25 so that their running surfaces 64 (FIG. 9) define a horizontal plane generally parallel to and spaced a short distance below the horizontal plane defined by the lowermost surfaces 56 and 57 of the platforms 28 and body 26. The vertical spacing between the support surfaces defined by the platforms 28 and the running surfaces defined by the wheels is preferably kept as small as practical, to provide ease of transitional movement through intersections and when moving from one intersecting track to another. It has been found that clearances from as low as one or two-thousandths of an inch up to one-quarter of an inch or more are satisfactory. The heavier the weight carried by the trolley, the more important it is to provide as slight a clearance as practical to decrease the extent to which the wheels will drop into the slot 16.

The trolleys 20 are specially adapted for facilitating movement thereof around or across intersections. Referring specifically to FIG. 8, the trolley 20 shown therein is disposed at the center of a right-angle intersection in which an east-west track 65 intersects a north-south track 66. The track sections are preferably radiused at 68 at the intersecting slots 16. When the trolley 20 moves to the position shown, for example from right-to-left, the wheels 35 roll on the track sections 15. As can be easily visualized, without the yoke 25, all the wheels 35 would drop into the slots 16 upon entering the intersection and would be supported only at the side edges of the slots 16, making it difficult, especially with heavy wall panels, to move the trolley 20 in any direction.

To move the wall panel, it would be necessary to exert a vertical force on the panel to assist the trolley wheels 35 out of the slots 16, and at the same time to exert a force in the desired direction to move the wheels 35 onto the adjacent or intersecting track sections 15 of the track 65 or 66. As can be readily appreciated, this problem is complicated where the panels extend high above the floor, because it is difficult to obtain the proper leverage to exert a force on the trolleys 20 in the direction desired.

With the present invention, however, when the trolley 20 advances to an intersection, as by moving from right to left to the position shown in FIG. 8, the westwardly facing platforms 28 move downwardly a short distance and engage the track sections 15 on their chamfered edges 66. With further movement, the support surfaces defined by the platforms 28 engage and support the trolley 20 on the track sections 16. Since the distance between the lowermost surfaces of the platforms 28 and the lowermost surfaces of the rollers 35 is small, the wheels are prevented from dropping deep into the track slots 15. Rather they are supported in a position where relatively little effort is required to move the wheels 35 back onto the track sections of either track 65 or track 66.

The relative positions of the running surfaces 64 of the wheels 35 and the support surfaces 56 of the platforms 28 are shown in FIG. 9. The surfaces 64 of all four wheels 35 are disposed only a few thousandths of an inch within the slots 16. The weight of the wall panel 22 (not shown) is supported by the surfaces 56 and 57 of the platforms 28 and body 26, and is transmitted to the yoke body 26 through the vertically inclined struts 30. The lowermost surface 56 of the platforms 28 are smooth, and may be provided with a coating or layer of low friction material, if desired, as described further in connection with the embodiment of FIGS. 11–14.

Referring to FIG. 10, a pair of trolleys 20a and 20b are shown supporting a wall panel 22 for movement in a main east-west track 11a intersected by a pair of north-south parallel stacking tracks 11b. The stacking tracks 11b are spaced apart a distance no greater than the space between the trolleys 20a and 20b, and storage is accomplished by moving the panels 22 individually until the trolleys are disposed within the intersections 74 and 75, and then moving the trolleys onto the storage tracks 11b perpendicular to the main track 11a. Ease of stacking in this fashion is assured since the platforms 28 prevent the wheels from falling into the slots and providing a rolling-to-sliding-to rolling transitional movement with a minimum of lifting, enabling heavy panels to be manipulated into stacked relation with ease.

FIG. 10 also shows a panel negotiating a sharp turn for example, by moving along track 11a and then, turning a 90° corner onto tracks 11c. This unexpected result is achieved because of the small distance between the planes defined by the lowermost surfaces 56 and 57 of the yoke 25 and the lowermost surfaces 64 of the wheels 35, and is facilitated by the trolley's generally circular configuration (FIG. 8) provided by the arcuate outer surfaces 60 of the platforms 28.

Referring to FIG. 10, if it is desired to move the panels endwise from east to west to the intersections 74 and 75 and then endwise around the corner of intersection 74 and southwardly onto track 11c, this may be accomplished by simply moving the panel 22 until the trolleys 20a and 20b engage the intersections 74 and 75, and then sliding trolley 20a onto track 11c. Continued sliding movement of trolley 20a on track 11c causes the trolley 20b to slide on track 11a, causing the wheels 35 on each trolley to go out of alignment with the track, and this sliding movement is continued until trolley 20b reaches intersection 74, whereupon both trolleys 20a and 20b resume rolling movement on the wheels 35 when trolley 20b is slidably moved onto track 11c. Since the trolleys do not pivot with respect to the panels, the wheels 35 become disoriented within the tracks (dotted lines FIG. 10), and the arcuate surfaces 60 of the platforms assure that the trolleys are not restrained by the side walls 77 of the track. FIG. 10 also illustrates an intersecting track segment 11d which forms an arcuate angle 77 with the track 11. With the trolleys of this invention, the track section 11d may be entered in either direction from the track 11a.

A further embodiment of the invention is shown in FIGS. 11–14 in which a trolley 100 includes a generally U-shaped yoke 102 which rotatably supports a conventional pair of trolley wheels 103 and 104. The wheels are conventionally mounted on a transverse support rod 105 extending through the upwardly turned sections 106 and 107 of the yoke 102.

The yoke 102 is apertured at the center and supports an essentially conventional pendant bolt 110. While this bolt may be fixed to the panel, the yoke 112 and associated structure are not so fixed but are adapted to pivot about the center line axis of the pendant bolt 110.

The embodiment of FIGS. 11–14 is further provided with a shoe plate 115 which is secured to the bottom of the yoke 112 by threaded fasteners 116. The shoe plate 115 has a pair of diametrically opposed cutout openings or portions 118 and 119 through which the lower peripheral portions of the wheels 104 and 103 respectively extend. Thus, normally, the shoe plate 115 is slightly elevated above and in clearing relation to the track.

Two transversely spaced rollers on vertical axes are employed in this embodiment. The first consists of a centering roller 120 which is mounted just below the lower surface of shoe plate 115 on the pendant bolt 110 and has a width proportion to be received within the track slot 16. The second of these rollers comprises a guide roller 124 which is mounted on a forward edge of the shoe plate 115, on a mounting bolt 125, so that the roller 124 is spaced below the lower surface of the plate 115 and is similarly received within the track slot 16. Looking at the plan view of FIG. 11 it will be seen that the roller 124 is arcuately centrally on the shoe plate 115 between the trolley wheels 103 and 104, so that when these trolley wheels are located in a straight section of the track, the guide roller 124 and the centering roller 120 are each positioned within the track slot 16.

The shoe plate 115 is formed with a lower support surface 130 which may consist of a thickness of low-friction plastic material or other suitable low-friction material. If plastic is used, it may consist of a layer of nylon or PTFE suitably bonded to the lower surface of the plate 115. The function of the support surface 130 is not unlike that of the surface 56 of the preceding embodiment in that it provides sliding support means for the trolley 100 when the same is crossing an intersection or negotiating a turn at an intersection.

However, the manner in which the trolley 100 makes a turn is somewhat different from that of the trolley 20, as may be understood by reference to FIG. 14. In this embodiment, as previously noted, the entire trolley 100 is free to turn or pivot with respect to the associated panel. The guide roller 124 may be either in a trailing position or in a leading position depending upon which direction the panel is being moved. It is adapted to be moved in either direction. Whichever position the guide roller is in, i.e., leading or trailing, it acts as a steering device. When trailing, at a 90° intersection, the centering roller 120 is moved to the center of the intersection and sideways pressure is applied, causing the trolley 100 to move in translation through the intersection with the same being supported on the surface 130 until the trolley wheels 103 and 104 are in alignment with the intersecting track section. The guide roller 124, when trailing, assures proper alignment when it, too, is brought into the track slot 16.

The diagram of FIG. 14, however, illustrates what happens at a 9s° intersection when the guide roller 124 is leading. The turn is being made as shown by the arrow 140. here, the guide roller 124 has first moved through the intersection into the opposed track slot 16a, and sideways pressure causes the centering roller 120 to guide the entire trolley into the adjacent intersecting track by movement of the roller into the slot 16b. With continued movement in the direction of the arrow 140, the guide roller 124 reverses direction, comes out of the track 16a, and now acts as a trailing roller to realign the trolley wheels with the track in the manner previously described. During transition through the intersection, the trolley is temporarily supported for sliding movement in the shoe plate 115.

While the forms of apparatus herein described constitutes preferred embodiments of the invention, it is to be understood that the invention is not limited to these precise forms of apparatus, and that changes may be made therein without departing from the scope of the invention.

What is claimed is:

1. A trolley for supporting a wall panel in a track system in which track sections define slots and in which track sections mutually intersect, comprising a yoke having a body, means for suspending said wall panel from said body, two pairs of axially aligned wheels for rolling on said track sections and rotatably supported by said body with the axis of said pairs at right angles to each other, the lowermost running surfaces of said wheels defining a common plane, a series of peripherally spaced platforms carried by said yoke and positioned in the arcuate spaces between adjacent wheels and having lower support surfaces defining a plane spaced above the plane of said running surfaces for engaging said track sections when said trolley wheels encounter a track intersection to prevent said wheels from dropping fully into the intersecting track slots and for slidably supporting said trolley on said track sections until a pair of wheels engage the track sections of an adjacent or intersecting track to provide a smooth and relatively effortless transitional movement of said trolley through said intersection.

2. In a movable wall panel system which includes a series of trolley-supported wall panels and at least two mutually intersecting tracks in which said tracks include parallel spaced-apart trolley-wheel sections defining slots therebetween, the combination with trolleys for supporting said wall panels comprising a yoke body in each said trolley, a transverse axle supported by said body, a pendant bolt having a body portion mounted on said transverse axle member and a shank portion rigidly connected to a said wall panel for suspending said wall panel from said body, a first pair of trolley wheels on said axle for selectively engaging said trolley wheel sections, bolts supported by said body at right angles to said axle supporting a second pair of said wheels at right angles to said first pair, means on said yoke body defining support surfaces positioned generally in the arcuate spaced between said wheels including a series of four peripherally spaced platforms formed integrally with and cantilevered from said body in the space between adjacent said wheels, said platforms defining a horizontal plane spaced slightly above the rolling plane of said wheels and proportioned to engage said track sections when said trolley encounters a track intersection providing support for said trolley and providing for sliding of said trolley on said track sections until said wheels are established on the track sections of an adjacent or an intersecting said track resulting in a smooth and relatively effortless transitional movement of said trolley through such intersection.

3. The combination defined in claim 2 wherein each of said platforms in a generally triangular disc defined by an arcuate outer surface which extends between a pair of generally converging side surfaces, and wherein each side surface cooperates with a corresponding side surface from the next peripherally spaced platform to define a space for receiving a lower portion of a wheel therebetween.

4. The combination of claim 2 further comprising a centering roller in said slot on said pendant bolt.

* * * * *